US008120659B2

(12) United States Patent
Li et al.

(10) Patent No.: US 8,120,659 B2
(45) Date of Patent: Feb. 21, 2012

(54) METHOD AND SYSTEM FOR MOTION ESTIMATION IN DIGITAL IMAGING APPLICATIONS

(75) Inventors: Dong Li, Cupertino, CA (US); Sheng Lin, Sunnyvale, CA (US)

(73) Assignee: Aptina Imaging Corporation, George Town (KY)

( * ) Notice: Subject to any disclaimer, the term of this patent is extended or adjusted under 35 U.S.C. 154(b) by 851 days.

(21) Appl. No.: 12/125,425

(22) Filed: May 22, 2008

(65) Prior Publication Data

US 2009/0290029 A1 Nov. 26, 2009

(51) Int. Cl.
*H04N 5/228* (2006.01)
*H04N 7/18* (2006.01)

(52) U.S. Cl. ...................... 348/208.4; 348/154; 348/155

(58) Field of Classification Search ............. 348/207.99, 348/208.99, 169, 154, 155, 208.4; 382/107
See application file for complete search history.

(56) References Cited

U.S. PATENT DOCUMENTS 5,157,732 A 10/1992 Ishii et al.
5,793,985 A 8/1998 Natarajan et al.
6,208,692 B1 3/2001 Song et al.
6,285,711 B1 9/2001 Ratakonda et al.
6,381,285 B1 4/2002 Borer
6,628,805 B1 9/2003 Hansen et al.
6,757,328 B1 6/2004 Huang et al.
6,891,891 B2 * 5/2005 Pau et al. ................. 375/240.16
6,925,123 B2 * 8/2005 Subramaniyan et al. 375/240.16
7,840,085 B2 * 11/2010 Nagaraj et al. ................ 382/254
2003/0063223 A1 4/2003 Ojo et al.
2004/0208341 A1 10/2004 Zhou et al.
2006/0244836 A1 * 11/2006 Batur ......................... 348/208.1
2007/0189386 A1 8/2007 Imagawa et al.
2007/0236578 A1 * 10/2007 Nagaraj et al. ........... 348/208.99

OTHER PUBLICATIONS

Aeron Buchanan and Andrew Fitzgibbon, "Combining local and global motion models for feature point tracking" available at http://research.microsoft.com/~awf/papers/buchanan07.pdf.

* cited by examiner

*Primary Examiner* — David Ometz
*Assistant Examiner* — Ahmed A Berhan
(74) *Attorney, Agent, or Firm* — Jason Tsai

(57) ABSTRACT

A method and system for estimating global motion in digital imaging applications with confidence level filtering. Motion search yields a plurality of vectors describing the movement of feature blocks from one frame to another. A confidence level is assigned to each motion vector. Based on the confidence levels, vectors are given more or less weight when estimating global motion. High-confidence vectors are given more weight than low-confidence vectors. Embodiments for estimating both the magnitude of global motion and the magnitude and direction of global motion are disclosed.

11 Claims, 6 Drawing Sheets

METHOD AND SYSTEM FOR MOTION ESTIMATION IN DIGITAL IMAGING APPLICATIONS

FIELD OF THE INVENTION

The disclosed embodiments relate generally to digital imaging and, more particularly, to methods and systems for estimating notion in a sequence of digital images.

BACKGROUND

Motion estimation is often required in video indexing, stabilization, and analysis applications. Block motion estimation is one common technique that involves locating a set of adjacent pixels (i.e., a "block" of pixels) from one frame in a subsequent frame. (Such blocks are sometimes also referred to as "feature blocks" because they are typically selected to include portions of a frame having strong two-dimensional features.) Vectors can be used to describe the movement of blocks from one frame to another. By combining vectors associated with a plurality of blocks, a "global" motion vector for the frame can be determined. A block motion estimation technique is described, for example, in U.S. application Ser. No. 12/046,860 assigned to Micron Technology, Inc.

Prior art block motion estimation techniques suffer from noise in the form of false motion vectors (i.e., motion vectors that incorrectly describe the movement of a respective block from one frame to another), which reduce global motion estimation accuracy. Therefore, a more reliable motion estimation method and associated system are desirable to reduce the impact of image noise and false motion vectors on global motion estimation accuracy.

DETAILED DESCRIPTION OF THE DISCLOSED EMBODIMENTS

In the following detailed description, reference is made to the accompanying drawings, which form a part hereof and show by way of illustration specific embodiments of the invention. These embodiments are described in sufficient detail to enable those skilled in the art to practice them, and it is to be understood that the disclosed embodiments may be modified and that other embodiments may be utilized. Moreover, the progression of steps described herein is merely an example. The sequence of steps is not limited to that set forth herein and may be changed or reordered, with the exception of steps necessarily occurring in a certain order.

Figure 1:
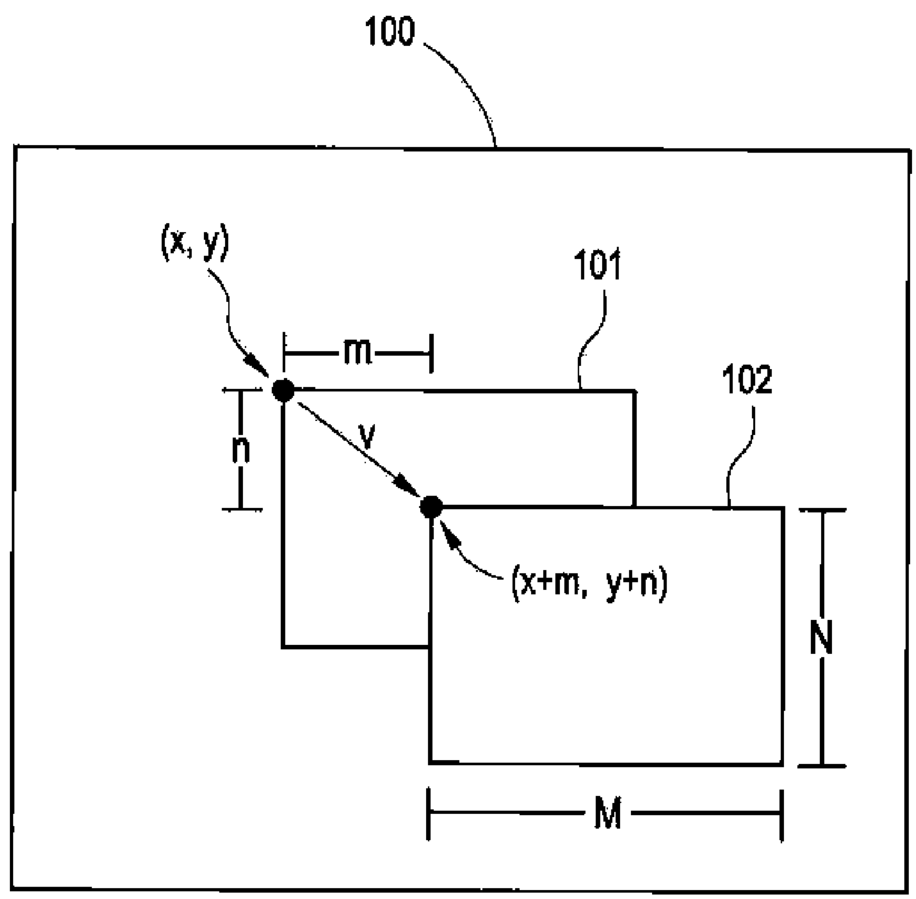
FIG. 1 illustrates movement of a pixel block from one image frame to another.

Referring to FIG. 1, a portion 100 of digital video fame is shown together with a representative block 101 of pixels. In the illustrated embodiment, the block 101 comprises pixels arranged in an M×N pattern. The motion of block 101 from one frame to another frame is illustrated by the position of the same block relabeled as block 102. A vector V, having a horizontal component m and a vertical component n, describes the motion of the block 100 between the frames. In other words, if the upper-left corner of the block 101 is at pixel location (x,y) in one frame, then the upper-left corner of the block (relabeled as block 102) would be at pixel location (x+m, y+n) in the other frame.

Motion vectors characterizing the movement of a plurality of blocks can be combined to estimate global motion. To improve the quality of global motion estimation, disclosed embodiments associate a confidence level with each motion vector. High-confidence motion vectors are weighted more heavily when estimating global motion. Conversely, low-confidence motion vectors are weighted less heavily when estimating global motion. Very low-confidence vectors can be discarded. In this way, the effect of noise in the form of false motion vectors (i.e., motion vectors that do not accurately describe the movement of a respective block from one frame to another) on the accuracy of global motion estimation can be reduced.

Figure 4:
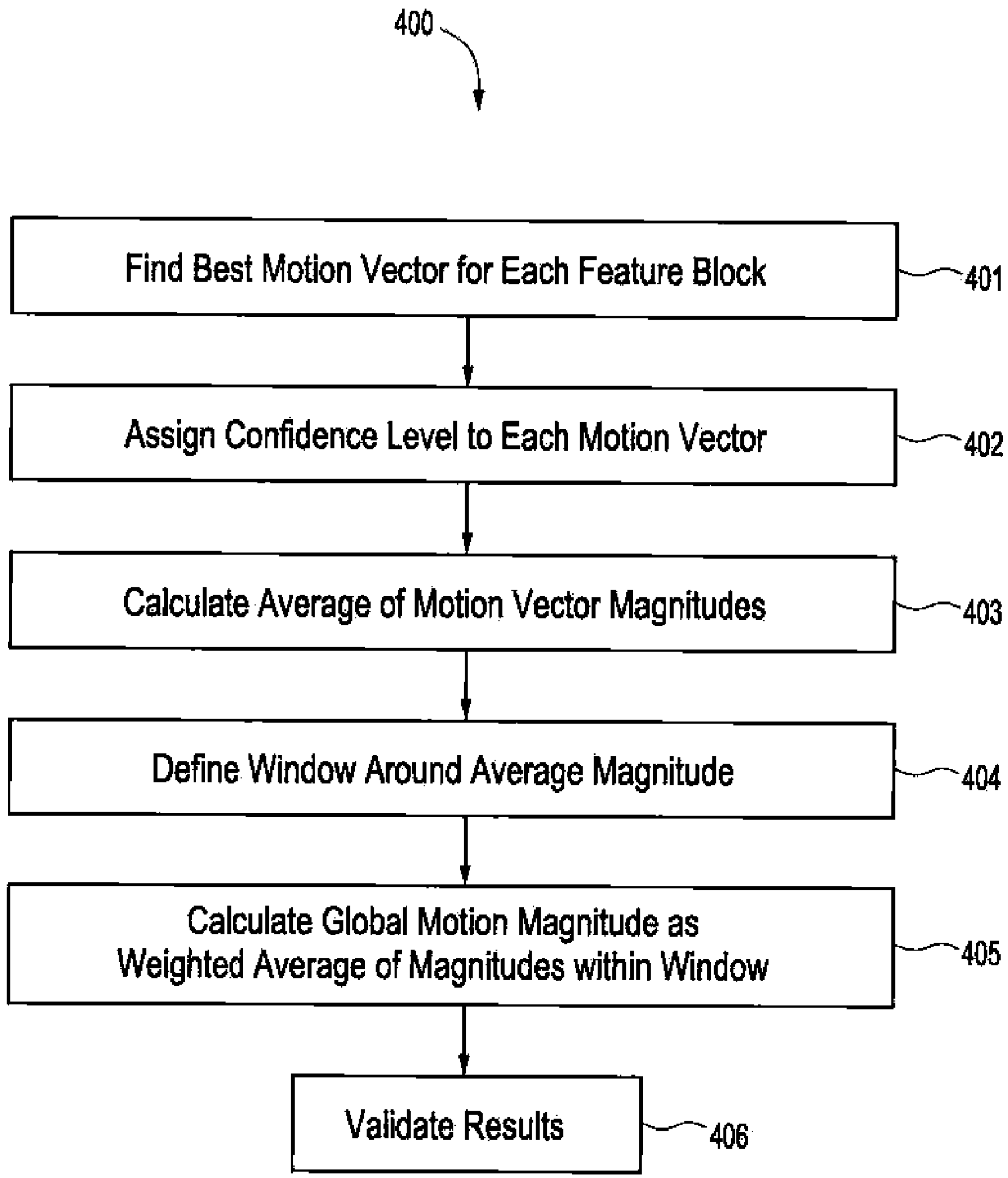
FIG. 4 is a flowchart illustrating a method of global motion magnitude estimation in accordance with a first disclosed embodiment.

FIG. 4 illustrates a method 400 of estimating the magnitude of global motion in accordance with a first disclosed embodiment. Such magnitude-only (i.e., directionless) global motion estimation algorithms are useful, for example, in image stabilization applications for selecting an appropriate camera ISO (i.e., light sensitivity) setting. Higher camera ISO settings decrease required integration time, thereby decreasing susceptibility to motion blur, but also increase image noise. Conversely, lower camera ISO settings increase required integration time, and therefore increase susceptibility to motion blur, but reduce image noise. A reliable global motion magnitude estimate can be used to select a camera ISO setting that minimizes image noise while avoiding perceptible motion blur.

At step 401, a best motion vector for each feature block in a frame (i.e., the motion vector that most accurately describes the movement of the block from one frame to another frame) is determined. Several motion estimation techniques are known in the art. One method is to compute the sum of absolute differences (SAD) of corresponding pixel values for a plurality of candidate vectors within a search window surrounding the block. The candidate motion vector with the lowest SAD is determined to be the best. The SAD for a particular candidate motion vector, denoted D(m,n), can be computed as follows:

$$D(m, n) = \sum_{i=1}^{M} \sum_{j=1}^{N} |y_A(x+i, y+j) - y_B(x+i+m, y+j+n)| \tag{1}$$

In Equation (1) above, (x,y) is the upper-left corner of a feature block, (m,n) is the candidate motion vector, $y_A(x,y)$ is the luminance channel value of the pixel at location (x,y) in a first frame, $y_B(x,y)$ is the luminance channel value of the pixel at location (x,y) in a second frame, and M×N are the dimensions of the feature block. Equation (1) can be used to compute SADs for a plurality of candidate motion vectors, the lowest of which is selected as the best motion vector. To reduce computational complexity, the range of candidate motion vectors (m,n) can be constrained to a search window wherein—p≦m, n≦p.

At step 402, a confidence level is assigned to each best motion vector determined at step 401. In a disclosed embodiment, the confidence level, denoted c, is selected from the set [1, 2, 3, 4], with 1 representing low confidence and 4 representing high confidence, as follows:

```
if D(m_min2,n_min2) > k1 D(m_min,n_min) then
    c = 4
else if D(m_min2,n_min2) ≦ k1 D(m_min,n_min) and
D(m_min2,n_min2) > k2 D(m_min,n_min) then
    c = 3
else if D(m_min2,n_min2) ≦ k2 D(m_min,n_min) and
D(m_min2,n_min2) > k3 D(m_min,n_min) then
    c = 2
else
    c = 1
```

In the confidence level selection statement above, $D(m_{min}, n_{min})$ is the SAD of the best motion vector, $D(m_{min_2}, n_{min_2})$ is the SAD of the second best motion vector, and $k_1$, $k_2$, and $k_3$ are empirically-determined constants. As described below, motion vectors assigned a high confidence level (e.g., c equal to 3 or 4) will be weighted more heavily when estimating global motion than those vectors assigned a low confidence level (e.g., c equal to 1 or 2).

The second best motion vector must satisfy a minimum distance criterion from the best motion vector. In a disclosed embodiment, the minimum distance criterion is defined as follows:

$$|m_{min_2} - m_{min}| + |n_{min_2} - n_{min}| > 1 \quad (2)$$

At step 403, a magnitude is determined for each motion vector. The motion vector magnitudes are then used to determine a weighted average or "center" motion vector magnitude. According to a disclosed embodiment, the magnitude A of a motion vector V having components (m,n) can be determined as follows:

$$A = \sqrt{m^2 + n^2} \quad (3)$$

The weighted average or "center" motion vector, denoted $A_{center}$, can then be determined based on the motion vector magnitudes as follows:

$$A_{center} = \frac{\sum_{i=1}^{N} A_i w_i}{\sum_{i=1}^{N} w_i} \quad (4)$$

In Equation (4) above, N is the number of motion vectors, $A_i$ is the magnitude of a motion vector $V_i$, and $w_i$ is a weight assigned to the motion vector $V_i$. In a disclosed embodiment, the weight $w_i$ of a motion vector $V_i$ can be set to the confidence level c of the motion vector $V_i$ determined at step 402.

At step 404, a window E is defined around the weighted average or "center" motion vector magnitude. Outlier motion vector magnitudes (i.e., motion vector magnitudes outside the window E) are excluded from global motion magnitude estimation. According to a disclosed embodiment, the magnitude $A_i$ of a motion vector $V_i$ is within the window E if it satisfies the following condition:

$$1 - \delta \le \frac{|A_i - A_{center}|}{A_{center}} \le 1 + \delta \quad (5)$$

In Equation (5) above, δ is an empirically determined parameter used to control the size of the window E. A larger δ results in a larger window E and exclusion of fewer motion vectors. Conversely, a smaller δ results in a smaller window E and exclusion of more motion vectors.

Figure 2:
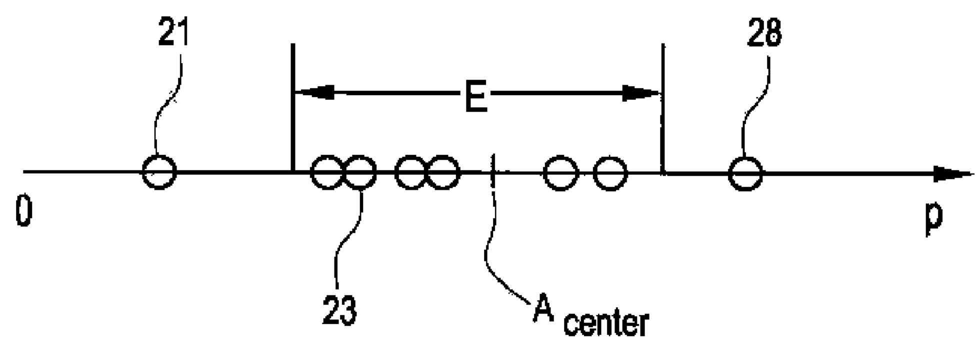
FIG. 2 is a plot of motion vector magnitudes with a window excluding outliers in accordance with a first disclosed embodiment.

FIG. 2 illustrates motion vector magnitude filtering by the window E. Motion vector magnitudes are represented by circles plotted along an axis ranging from 0 (i.e., no movement) top (i.e., the limit of the search window described above with reference to Equation (1)). Boundaries of the window E are illustrated by tall vertical Lines extending upwards from the axis. The weighted average motion vector magnitude, $A_{center}$, is illustrated by a short hash mark extending through the axis. A plurality of motion vector magnitudes, including, for example, motion vector magnitude 23, are within the window E. These motion vector magnitudes contribute to global motion magnitude estimation, as described below with reference to step 405. Other motion vector magnitudes, including, for example, motion vector magnitudes 21, 28 are outside the window E. These outlying motion vector magnitudes, which are more likely false motion vectors caused by image noise, are excluded from global motion magnitude estimation.

Referring again to FIG. 4, at step 405, a global motion magnitude, denoted $A_{global}$, is estimated based on the motion vector magnitudes within the window E. According to a disclosed embodiment, the global motion magnitude, $A_{global}$, is determined as follows:

$$A_{global} = \frac{\sum_{i} A_i w_i}{\sum_{i} w_i} \quad (6)$$

In Equation (6) above, $A_i$ is the magnitude of a motion vector $V_i$ and $w_i$ is a weight assigned to the motion vector $V_i$. In a disclosed embodiment, the weight $w_i$ of a motion vector $V_i$ can be set equal to, or proportional to, the confidence level c of the motion vector $V_i$ determined at step 402.

At step 406, the global motion vector magnitude, $A_{global}$, is validated by determining whether the confidence levels of the underlying motion vectors are sufficient to yield a reliable result. According to a disclosed embodiment, the confidence levels associated with the motion vectors are summed and compared to an empirically-determined threshold. Expressed formulaically, a global motion vector magnitude, $A_{global}$, is valid if it satisfies the following condition:

$$\sum_{i=1}^{N} c_i \ge \text{threshold} \quad (7)$$

In Equation (7) above, $c_i$ is the confidence level of a motion vector $V_i$ and N is the number of motion vectors within the window E.

If the condition of Equation (7) is satisfied, then the global motion magnitude, $A_{global}$, is deemed valid. Otherwise, if the condition of Equation (7) is not satisfied, then the global motion magnitude, $A_{global}$, is deemed unreliable. This may be due to, for example, blurry or noisy video frames. In this case, global motion magnitudes from previous frames can be: averaged or otherwise smoothed to estimate a global motion magnitude, $A_{global}$, for the present frame.

Figure 5:
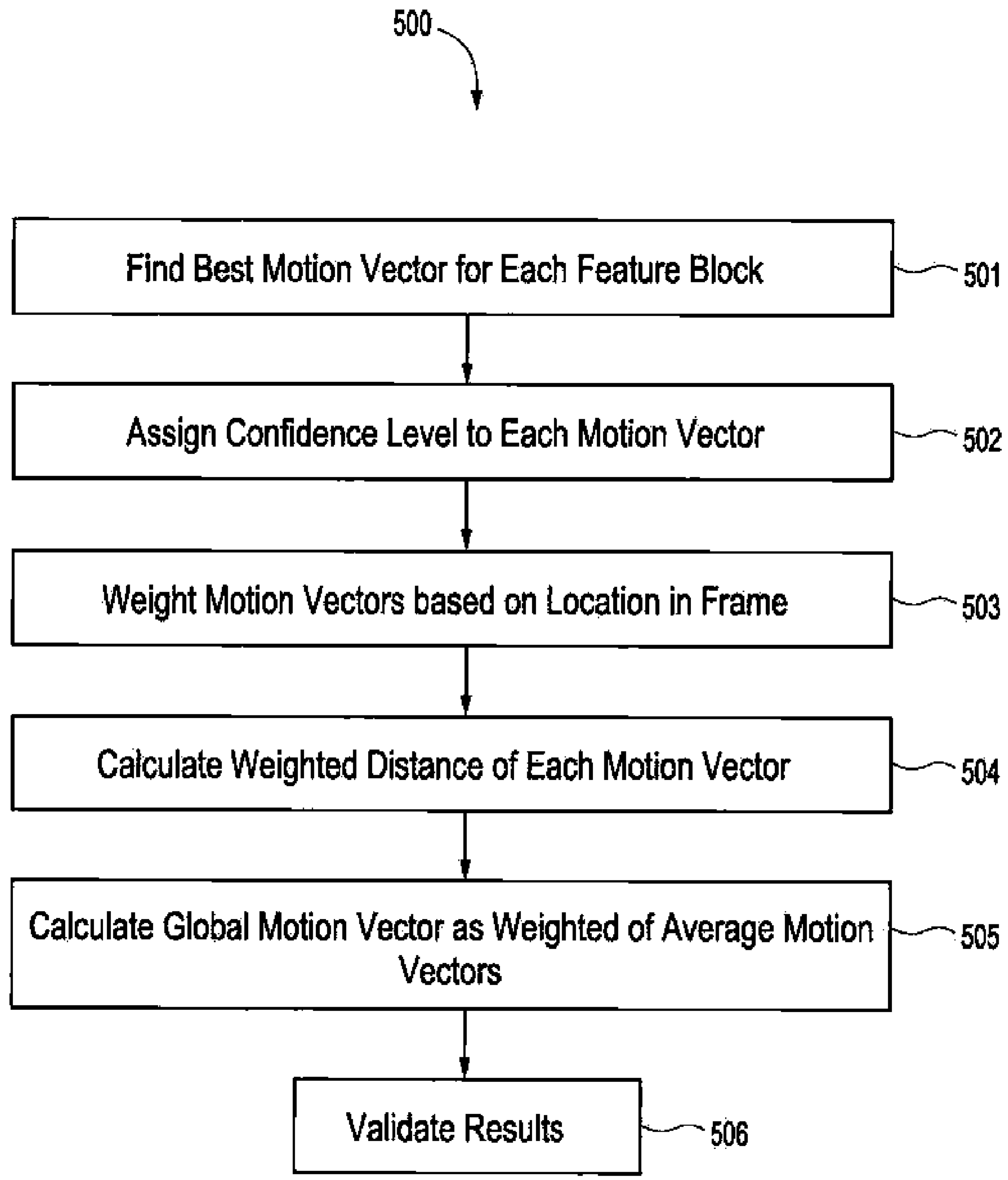
FIG. 5 is a flowchart illustrating a method of global motion vector estimation in accordance with a second disclosed embodiment.

FIG. 5 illustrates a method 500 of estimating a global motion vector in accordance with a second disclosed embodiment. Unlike the first disclosed embodiment, the output of the second disclosed embodiment is a vector (i.e., the output includes both a magnitude and a direction). In other words, the global motion vector indicates both the magnitude and direction of global motion. Global motion vectors can be used, for example, in video stabilization and motion-based video indexing applications where the direction of motion, rather than only the magnitude of motion, is required.

At step 501, a best motion vector for each feature block in a frame (i.e., the motion vector that most accurately describes the movement of the block from one frame to another frame) is determined. Several motion estimation techniques are known in the art. For example, an embodiment could use the sum of absolute differences (SAD) techniques described above with reference to step 401 of FIG. 4 and Equation (1).

At step 502, a confidence level is assigned to each best motion vector determined at step 501. In a disclosed embodiment, the confidence level is selected from the set [1, 2, 3, 4], with 1 representing low confidence and 4 representing high confidence, as described above with reference to step 402 of FIG. 4.

Figure 3:
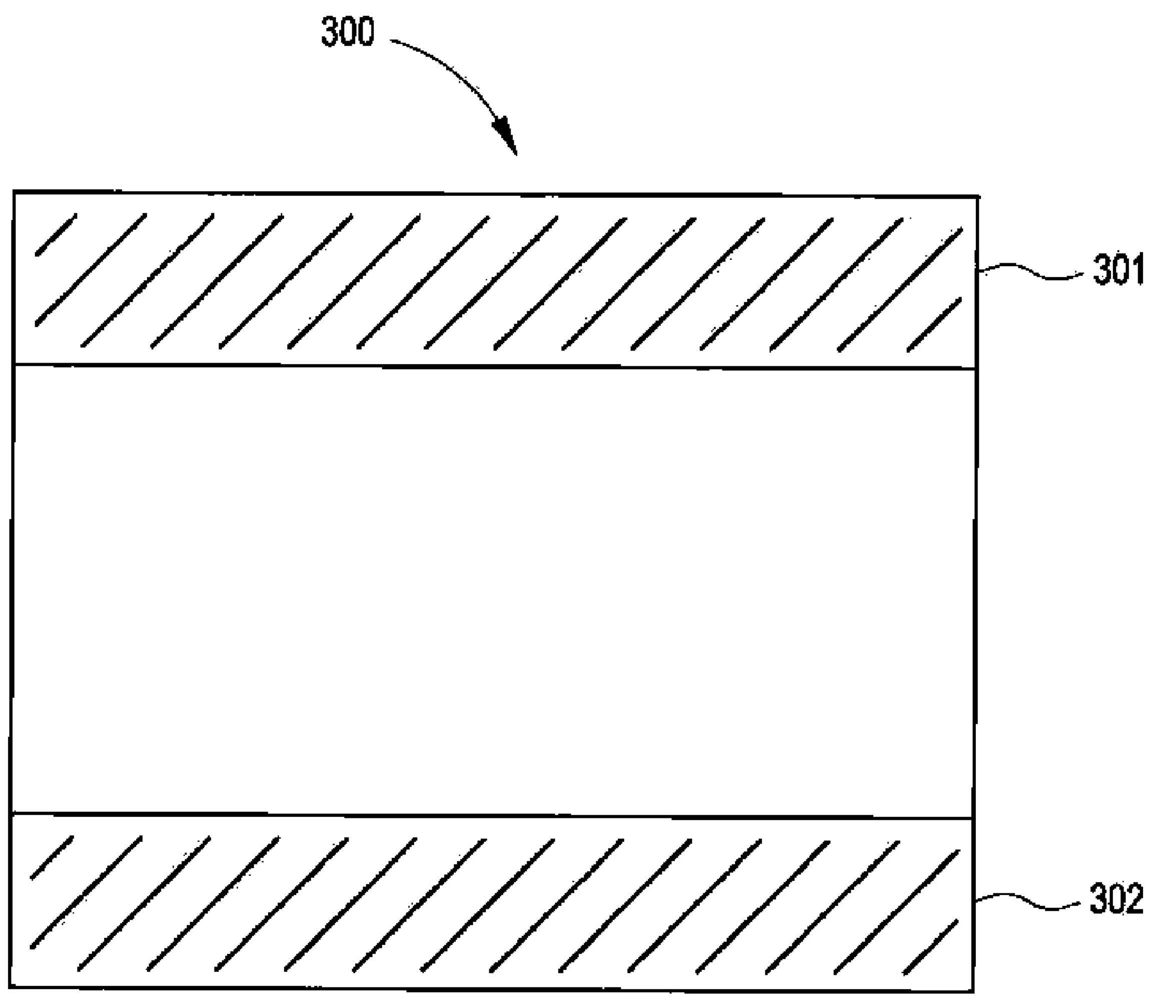
FIG. 3 illustrates an image frame with top and bottom portions having different weights in accordance with a disclosed embodiment.

At step 503, a weight is assigned to each motion vector. According to a disclosed embodiment, the weight is selected based on the location of the motion vector within the frame. For example and with reference to FIG. 3, in video stabilization applications more weight could be given to motion vectors in the upper portion 301 and lower portion 302 of a frame 300 since moving objects, whose own motion could disrupt global motion estimation, are more likely to be located at the center of the frame 300.

At step 504, a weighted distance, denoted $L_i$, is determined for each motion vector $V_i$. According to a disclosed embodiment, the weighted distance, $L_i$, is computed as follows:

$$L_i = \sum_{j=1}^{N} k_j \|V_i - V_j\|_\gamma \tag{8}$$

In Equation (8) above, $k_j$ refers to the weight assigned to a vector $V_j$ at step 503, N is the number of motion vectors, and γ characterizes the employed norm. For example, γ=2 corresponds to Euclidean distance. For a vector V having a horizontal component x and a vertical component γ, Euclidean distance can be computed as follows:

$$\|V\|_2 = \sqrt{x^2+y^2} \tag{9}$$

To reduce computational cost, γ=1 can be selected. For a vector V having a horizontal component x and a vertical component γ, a norm with γ=1 can be computed as follows:

$$\|V\|_1 = |x|+|y| \tag{10}$$

At step 505, a global motion vector, denoted $V_{global}$, is determined based on a subset of the N motion vectors. The subset is selected based on the weighted distance $L_i$ associated with each vector $V_i$. More specifically, the subset can be defined as the M vectors having the smallest weighted distance. According to a disclosed embodiment, the number of vectors in the subset is determined as follows:

$$M = \frac{N+1}{2} \tag{11}$$

This subset of M vectors can then be used to determine the global motion vector, $V_{global}$, as follows:

$$V_{global} = \frac{\sum_{i=1}^{M} V_i w_i}{\sum_{i=1}^{M} w_i} \tag{12}$$

In Equation (12) above, $w_i$ is a weight assigned to the motion vector $V_i$. In a disclosed embodiment, the weight $w_i$ of a motion vector is equal to, or proportional to, the confidence level assigned to the motion vector at step 502.

At step 506, the global motion vector, $V_{global}$, is validated by determining whether the confidence levels of the underlying motion vectors are sufficient to yield a reliable result. According to a disclosed embodiment, the confidence levels associated with the motion vectors are summed and compared to an empirically-determined threshold, as described above with reference to step 406 of FIG. 4 and Equation (7). If the global motion vector, $V_{global}$, is determined to be unreliable, then global motion vectors for previous frames can be averaged or otherwise smoothed to estimate a global motion vector for the present frame.

Figure 6:
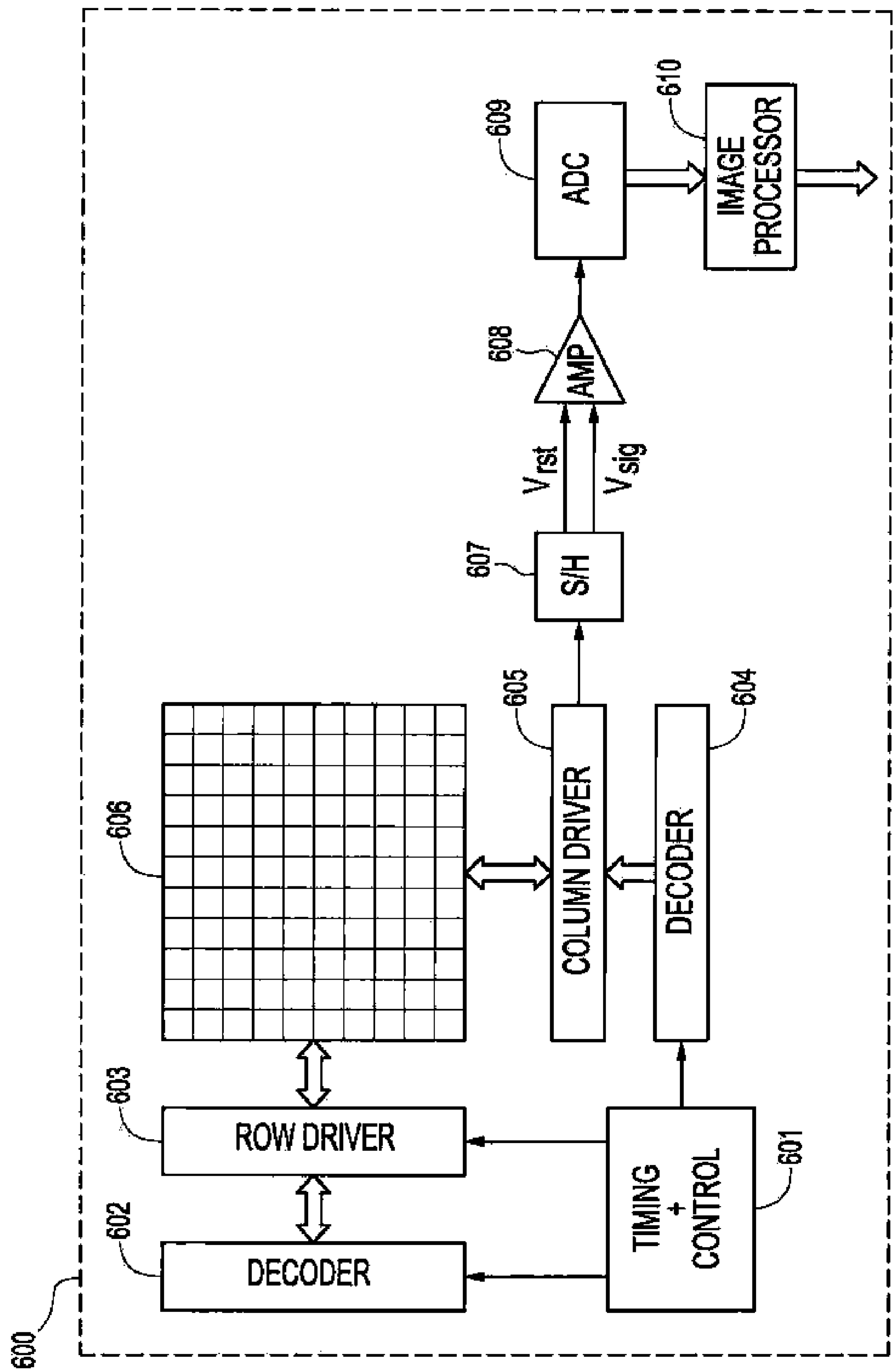
FIG. 6 is a partial top-down block diagram of an imager and associated readout circuitry constructed in accordance with a disclosed embodiment.

The following paragraphs describe how to implement embodiments of the disclosure in an imager and a processor system. FIG. 6 is a partial block diagram view of an imager 600 and associated read-out circuitry constructed in accordance with an embodiment disclosed herein. Although FIG. 6 illustrates a CMOS imager and associated read-out circuitry, embodiments may include other types of imagers, for example a CCD imager.

When the imager 600 is operated to capture light, the pixel cells in each row of pixel array 606 are all turned on at the same time by a row select line, and the signals of the pixel cells of each column are selectively output onto output lines by respective column select lines. A plurality of row and column select lines are provided for the array. The row lines are selectively activated in sequence by a row driver 603 in response to a row address decoder 602 and the column select lines are selectively activated in sequence for each row activation by a column driver 605 in response to a column address decoder 604. Thus, row and column addresses are provided for each pixel cell of the pixel array 606. The imager 600 is operated by the timing and control circuit 601, which controls the address decoders 602, 604 for selecting the appropriate row and column select lines for pixel cell read-out, and the row and column drivers 603, 605, which apply driving voltage to the drive transistors of the selected row and column lines.

In a CMOS imager, the pixel cell output signals typically include a pixel reset signal $V_{rst}$ taken off of a floating diffusion region (via a source follower transistor) when it is reset and a pixel image signal $V_{sig}$, which is taken off the floating diffusion region (via the source follower transistor) after charges generated by an image are transferred to it. The $V_{rst}$ and $V_{sig}$ signals for each pixel of pixel array 606 are read by a sample and hold circuit 607 and are subtracted by a differential amplifier 608 that produces a difference signal ($V_{rst}$-$V_{sig}$) for each pixel cell of pixel array 606, which represents the amount of light impinging on the pixel cell. This signal difference is digitized by an analog-to-digital converter (ADC) 609. The digitized pixel signals are then fed to an image processor 610 which processes the pixel signals and forms a digital image output. It is also possible to have separate driver and read-out circuits for each sub-array with the pixel output signal from the ADC 609 of each sub-array feeding into a common image processor circuit 610. As depicted in FIG. 6, the imager 600 is formed on a single semiconductor chip, although other configurations are possible, as known in the art.

Image processor circuit 610, which is configured to perform motion estimation in accordance with a disclosed embodiment, may be constructed as a hardware circuit with associated memory, or as a programmed processor with associated memory, or as a combination of a hardware circuit and a programmed processor with associated memory. In one embodiment, the image processor circuit 610 is a pixel signal pipeline processing circuit configured to perform motion estimation with confidence level filtering in accordance with the disclosed embodiments. Other configurations are possible, however. For example, motion blur reduction might not be performed in the pixel processing pipeline at all but rather by a central processing unit (CPU) 704 connected to the imager 600 by a bus 703, as shown in FIG. 7, or by a stand alone computer that receives an sequence of frames from imager 600 via a communications medium (e g., a portable data storage device such as, for example, a flash memory card or a compact disc or a transmission medium such as, for example, the Internet, a serial or parallel cable, or a local area network).

Figure 7:
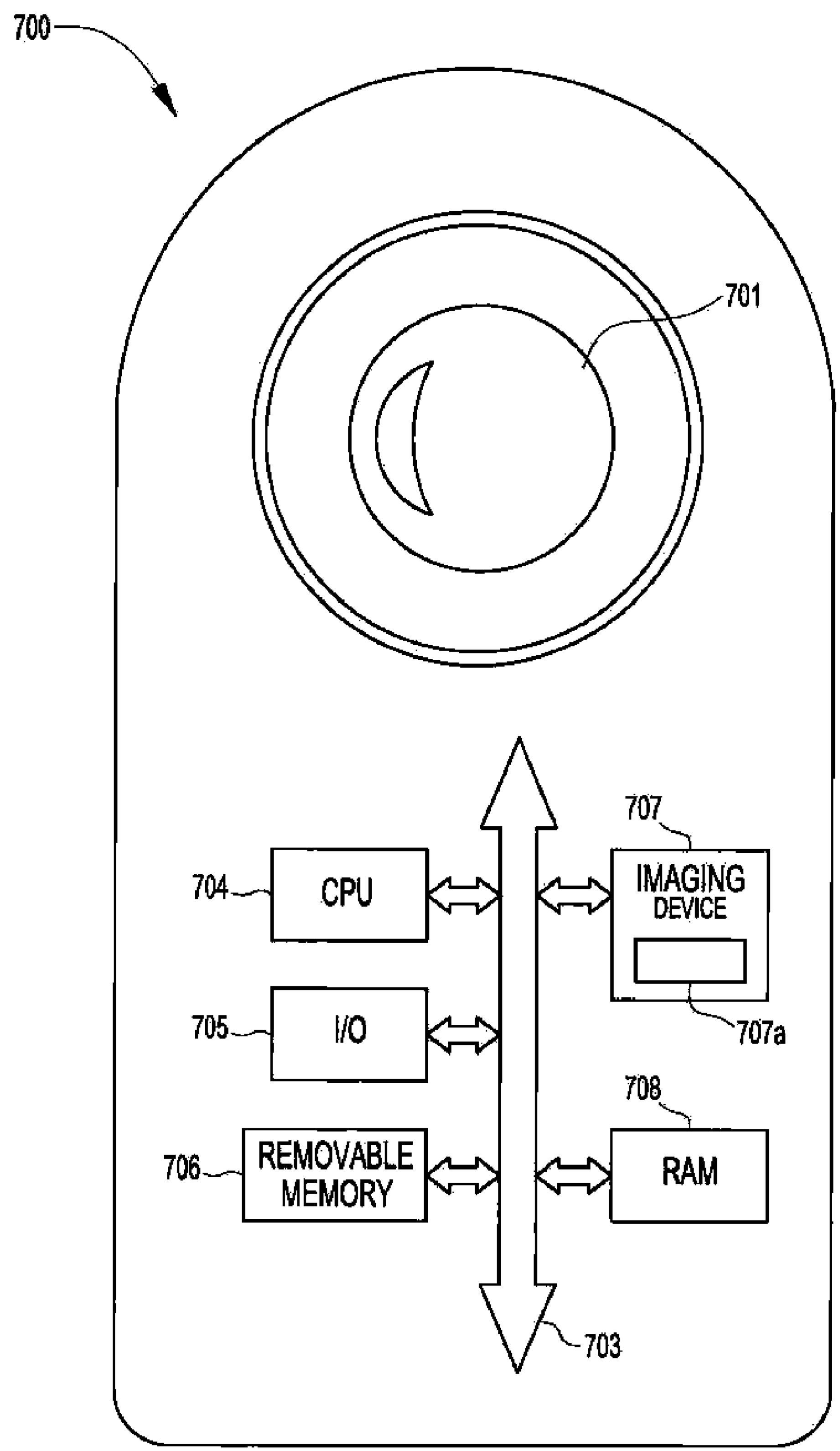
FIG. 7 is a block diagram of a processor system constructed in accordance with a disclosed embodiment.

FIG. 7 shows a typical processor system 700, such as, for example, a digital camera. The system 700 includes a CPU 704 configured to implement motion estimation with confidence level filtering in accordance with the disclosed embodiments. Without being limited, such a system could also be a personal computer or workstation, camera, scanner, machine vision, vehicle navigation system video phone, surveillance system, auto focus system, star tracker system, motion detection system, image stabilization system, or any other system able to implement the disclosed embodiments.

In one embodiment in which the system 700 is a digital video camera, the system 700 includes a lens 701 for focusing an image on a pixel array 707*a* of an imaging device 707. System 700 also comprises the CPU 704, such as a microprocessor that controls camera functions and image flow, and communicates with an input/output (I/O) device 705 over a bus 703. The CPU 704 might also perform motion estimation with confidence level filtering in accordance with a disclosed embodiment, although this could be accomplished by another processor or even a dedicated image processing chip (not shown). The imager 707 also communicates with the CPU 704 over the bus 703. The system 700 also includes random access memory (RAM) 709, and can include removable memory 706, such as flash memory, which also communicates with the CPU 704 over the bus 703. The imaging device 707 may be combined with the CPU 704, with or without memory storage on a single integrated circuit or on a different chip than the CPU.

In another embodiment, the system 700 is a personal computer comprising a CPU 704, which communicates with an I/O device 705 and RAM 708 over a bus 703. In this embodiment, the system 700 does not necessarily include an imaging device 707. Rather, digital pixel values are transferred from another device, for example a digital video camera, via any communications medium, for example by the I/O device 705. The digital pixel values may be in the form of an MPEG video file generated by a digital video camera or any other suitable image or video format. The I/O device 705 might be, for example, a USB port, a memory card reader, a network port, a parallel port, a serial port, a FireWire port, a floppy disk drive, an optical disk drive, or a wireless transceiver. Once loaded in a memory, for example RAM 708 or possibly non-volatile storage such as a hard drive (not shown), the CPU 704 can perform motion estimation with confidence level filtering in accordance with the embodiments disclosed herein. The resulting image might then be saved in a memory, for example removable memory 706 or RAM 708, output via an output device (not shown), for example a photo printer, posted on the Internet, or manipulated further by software.

While embodiments have been described in detail in connection with the examples known at the time, it should be readily understood that they are not limited to such disclosed embodiments. Rather, they can be modified to incorporate any number of variations, alterations, substitutions, or equivalent arrangements not heretofore described. Accordingly, the claimed invention is not to be seen as limited by the foregoing description, but is only limited by the scope of the attached claims.

What is claimed as new and desired to be protected by Letters Patent of the United States is:

1. A method of estimating global motion magnitude in digital video frames, the method comprising:

identifying for each of a plurality of features in the digital video frames a best motion vector among a plurality of candidate motion vectors that most closely corresponds to the motion of the feature between a first frame and a second frame and a second best motion vector that second most closely corresponds to the motion of the feature between the first frame and the second frame;

assigning a confidence level to each best vector based on a comparison of the best motion vector with a respective second best motion vector;

calculating a magnitude of each best motion vector;

determining an average motion magnitude based on the magnitude and confidence level of the best motion vectors; and estimating the global motion magnitude based on the magnitude and confidence level of each best motion vector having magnitudes within a window of magnitudes surrounding the average motion magnitude, wherein the best and second best motion vectors satisfy the following condition:

$$|m_{min_2}-m_{min}|+|n_{min_2}-n_{min}|>1$$

wherein $m_{min}$, is the horizontal component of the best motion vector, $n_{min}$ is the vertical component of the best motion vector, $m_{min2}$ is the horizontal component of the second best motion vector, and $n_{min2}$ is the vertical component of the second best motion vector.

2. The method of claim 1, wherein the identifying step comprises computing a sum of absolute differences (SAD) associated with each of the candidate motion vectors.

3. The method of claim 2, wherein the identifying step further comprises selecting the motion vector with the lowest SAD as a best motion vector and selecting the motion vector with the next lowest SAD as a second best motion vector.

4. The method of claim 3, where the confidence level is assigned as follows:

if $D(m_{min_2},n_{min_2}) > k_1 D(m_{min},n_{min})$ then
  $c = 4$
else if $D(m_{min_2},n_{min_2}) \leqq k_1 D(m_{min},n_{min})$ and $D(m_{min_2},n_{min_2}) > k_2 D(m_{min},n_{min})$ then -continued

```
    c = 3
else if D(m_min2,n_min2) ≦ k2D(m_min,n_min) and
D(m_min2,n_min2) > k3D(m_min,n_min) then
    c = 2
else
    c = 1
```

wherein c is the confidence level, $D(m_{min}, n_{min})$ is the SAD of the best motion vector, $D(m_{min2}, n_{min2})$ is the SAD of the second best motion vector, and $k_1$, $k_2$, and $k_3$ are constants.

5. A method of estimating global motion magnitude in digital video frames, the method comprising:

identifying for each of a plurality of features in the digital video frames a best motion vector among a plurality of candidate motion vectors that most closely corresponds to the motion of the feature between a first frame and a second frame and a second best motion vector that second most closely corresponds to the motion of the feature between the first frame and the second frame;

assigning a confidence level to each best vector based on a comparison of the best motion vector with a respective second best motion vector;

calculating a magnitude of each best motion vector;

determining an average motion magnitude based on the magnitude and confidence level of the best motion vectors; and estimating the global motion magnitude based on the magnitude and confidence level of each best motion vector having magnitudes within a window of magnitudes surrounding the average motion magnitude, wherein the average motion magnitude is calculated as follows:

$$A_{center} = \frac{\sum_{i=1}^{N} A_i w_i}{\sum_{i=1}^{N} w_i}$$

wherein $A_{center}$ is the average motion magnitude, $A_i$ is the magnitude of a best motion vector, and $w_i$ is the confidence level of the best motion vector.

6. A method of estimating global motion magnitude in digital video frames, the method comprising:

identifying for each of a plurality of features in the digital video frames a best motion vector among a plurality of candidate motion vectors that most closely corresponds to the motion of the feature between a first frame and a second frame and a second best motion vector that second most closely corresponds to the motion of the feature between the first frame and the second frame;

assigning a confidence level to each best vector based on a comparison of the best motion vector with a respective second best motion vector;

calculating a magnitude of each best motion vector;

determining an average motion magnitude based on the magnitude and confidence level of the best motion vectors; and estimating the global motion magnitude based on the magnitude and confidence level of each best motion vector having magnitudes within a window of magnitudes surrounding the average motion magnitude, wherein a magnitude of a best motion vector is determined to be within the window if the following condition is true:

$$1 - \delta \le \frac{|A_j - A_{center}|}{A_{center}} \le 1 + \delta$$

wherein $A_i$ is the magnitude of a best motion vector, $A_{center}$ is the average motion magnitude, and δ is a constant.

7. A method of estimating global motion magnitude in digital video frames, the method comprising:

identifying for each of a plurality of features in the digital video frames a best motion vector among a plurality of candidate motion vectors that most closely corresponds to the motion of the feature between a first frame and a second frame and a second best motion vector that second most closely corresponds to the motion of the feature between the first frame and the second frame;

assigning a confidence level to each best vector based on a comparison of the best motion vector with a respective second best motion vector;

calculating a magnitude of each best motion vector;

determining an average motion magnitude based on the magnitude and confidence level of the best motion vectors; and estimating the global motion magnitude based on the magnitude and confidence level of each best motion vector having magnitudes within a window of magnitudes surrounding the average motion magnitude, wherein the global motion magnitude is estimated as follows:

$$A_{global} = \frac{\sum_i A_i w_i}{\sum_i w_i}$$

wherein $A_{global}$ is the global motion magnitude, $A_i$ is the magnitude of a best motion vector, and $w_i$ is the confidence level of the best motion vector.

8. A method of estimating a global motion vector in digital video frames, the method comprising:

identifying for each of a plurality of feature blocks a first motion vector that most closely corresponds to the motion of the feature block between a first frame and a second frame and a second motion vector that second most closely corresponds to the motion of the feature block between the first frame and the second frame;

computing a first sum of absolute differences associated with the first motion vector and a second sum of absolute differences associated with the second motion vector;

assigning a confidence level to each first motion vector based on a comparison of the second sum of absolute differences with the first sum of absolute differences multiplied by an empirically-determined constant;

assigning a weight to each first motion vector based on the location of the first motion vector within the first or second frame;

calculating a weighted distance of each first motion vector;

selecting a subset of the first motion vectors having lowest weighted distances among the first motion vectors; and estimating the global motion vector based on the subset of first motion vectors and the confidence level assigned to each first motion vector in the subset, wherein the weighted distance of a motion vector is calculated as follows:

$$L_i = \sum_{j=1}^{N} k_j \|V_i - V_j\|_\gamma$$

wherein $V_i$ and $V_j$ are motion vectors, $L_i$ is the weighted distance of the motion vector $V_i$, $k_j$ is the weight assigned to the motion vector $V_j$ and γ characterizes the employed norm.

9. The method of claim 8, wherein γ=1 and the norm of a vector V is calculated as follows:

$$\|V\|_1 = |x| + |y|$$

wherein x is the horizontal component of the vector V and γ is the vertical component of the vector V.

10. A method of estimating a global motion vector in digital video frames, the method comprising:

identifying for each of a plurality of feature blocks a first motion vector that most closely corresponds to the motion of the feature block between a first frame and a second frame and a second motion vector that second most closely corresponds to the motion of the feature block between the first frame and the second frame;

computing a first sum of absolute differences associated with the first motion vector and a second sum of absolute differences associated with the second motion vector;

assigning a confidence level to each first motion vector based on a comparison of the second sum of absolute differences with the first sum of absolute differences multiplied by an empirically-determined constant;

assigning a weight to each first motion vector based on the location of the first motion vector within the first or second frame;

calculating a weighted distance of each first motion vector;

selecting a subset of the first motion vectors having lowest weighted distances among the first motion vectors; and estimating the global motion vector based on the subset of first motion vectors and the confidence level assigned to each first motion vector in the subset, wherein the number of first motion vectors in the subset is calculated as follows:

$$M = \frac{N+1}{2}$$

wherein M is the number of first motion vectors in the subset and N is the total number of first motion vectors.

11. A method of estimating a global motion vector in digital video frames, the method comprising:

identifying for each of a plurality of feature blocks a first motion vector that most closely corresponds to the motion of the feature block between a first frame and a second frame and a second motion vector that second most closely corresponds to the motion of the feature block between the first frame and the second frame;

computing a first sum of absolute differences associated with the first motion vector and a second sum of absolute differences associated with the second motion vector;

assigning a confidence level to each first motion vector based on a comparison of the second sum of absolute differences with the first sum of absolute differences multiplied by an empirically-determined constant;

assigning a weight to each first motion vector based on the location of the first motion vector within the first or second frame;

calculating a weighted distance of each first motion vector;

selecting a subset of the first motion vectors having lowest weighted distances among the first motion vectors; and estimating the global motion vector based on the subset of first motion vectors and the confidence level assigned to each first motion vector in the subset, wherein the global motion vector is estimated as follows:

$$V_{global} = \frac{\sum_{i=1}^{M} V_i w_i}{\sum_{i=1}^{M} w_i}$$

wherein $V_{global}$ is the global motion vector, M is the number of first motion vectors in the subset, $V_i$ is a first motion vector, and $w_i$, is the confidence level assigned to a first motion vector.

* * * * *